United States Patent
Kotera et al.

(10) Patent No.: US 8,482,832 B2
(45) Date of Patent: Jul. 9, 2013

(54) VIBRATING MIRROR ELEMENT

(75) Inventors: Hidetoshi Kotera, Kyoto (JP); Isaku Kanno, Kyoto (JP); Manabu Murayama, Daito (JP); Naoki Inoue, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 750 days.

(21) Appl. No.: 12/614,817

(22) Filed: Nov. 9, 2009

(65) Prior Publication Data
US 2010/0149615 A1 Jun. 17, 2010

(30) Foreign Application Priority Data
Dec. 15, 2008 (JP) ................................ 2008-318709

(51) Int. Cl.
*G02B 26/08* (2006.01)
(52) U.S. Cl.
USPC ................ 359/224.1; 359/199.1; 359/199.4
(58) Field of Classification Search
USPC ................ 359/198.1–199.4, 200.6–200.8, 213.1–215.1, 221.2, 224.1–224.2
See application file for complete search history.

(56) References Cited

U.S. PATENT DOCUMENTS

| 7,394,583 | B2 | 7/2008 | Akedo et al. |
| 7,446,911 | B2 | 11/2008 | Asai et al. |
| 7,864,392 | B2 | 1/2011 | Ueyama |
| 2007/0269199 | A1 | 11/2007 | Mori et al. |
| 2009/0174921 | A1* | 7/2009 | Sendo ................ 359/200.7 |
| 2010/0142023 | A1* | 6/2010 | Kanno et al. ....... 359/224.1 |

FOREIGN PATENT DOCUMENTS

| JP | 10-174462 A | 6/1998 |
| JP | 2001-264676 | 9/2001 |
| JP | 2005-333048 A | 12/2005 |
| JP | 2006-293116 A | 10/2006 |
| JP | 2007-10823 A | 1/2007 |
| JP | 3956933 B2 | 5/2007 |
| JP | 2007-312465 A | 11/2007 |
| JP | 2008-40353 A | 2/2008 |
| JP | 4092283 B2 | 3/2008 |
| JP | 2008-203299 | 9/2008 |

OTHER PUBLICATIONS

European Search Report dated Mar. 26, 2010 (six (6) pages).

* cited by examiner

*Primary Examiner* — James Phan
(74) *Attorney, Agent, or Firm* — Crowell & Moring LLP

(57) ABSTRACT

This vibrating mirror element includes a mirror portion reflecting light, a torsionally deformable beam portion connected to the mirror portion for supporting the mirror portion in a vibratile manner, and a driving portion having a connecting portion connected with the beam portion for driving the mirror portion through the torsionally deformable beam portion. The width of the connecting portion of the driving portion is rendered smaller than the width of a portion of the driving portion other than the connecting portion in plan view.

21 Claims, 8 Drawing Sheets

WIDTH OF DRIVING PORTION IS REDUCED FROM CENTRAL PORTION TOWARD END PORTION (CORRESPONDING TO EXAMPLES 1 & 2)

VIBRATING MIRROR ELEMENT

BACKGROUND OF THE INVENTION

1. Field of the Invention

The present invention relates to a vibrating mirror element, and more particularly, it relates to a vibrating mirror element including a driving portion.

2. Description of the Background Art

A vibrating mirror element including a driving portion is known in general, as disclosed in each of Japanese Patent Laying-Open Nos. 2005-333048 and 10-174462 (1998), Japanese Patent No. 4092283, Japanese Patent Laying-Open Nos. 2007-312465 and 2006-293116, Japanese Patent No. 3956933 and Japanese Patent Laying-Open No. 2007-10823, for example.

The aforementioned Japanese Patent Laying-Open No. 2005-333048 discloses an actuator including a driving arm supported by support portions on both end portions and so formed that the width thereof is reduced from both end portions toward a central portion in plan view and driving electrodes provided with piezoelectric layers and formed on the lower surfaces of both end portions of the driving arm respectively. In this actuator, the driving electrodes are so provided on both end portions of the driving arm as to ensure the areas of the driving electrodes while the width of the driving arm is reduced from both end portions toward the central portion so that the driving arm can be rendered easily deflectable in the vertical direction, whereby a driving region can be enlarged.

The aforementioned Japanese Patent Laying-Open No. 10-174462 discloses a piezoelectric conversion vibrator shaped into an isosceles triangle so that the width thereof is reduced from fixed ends fixed to stationary members toward a forward free end mounted with a weight and formed to have a constant thickness. This piezoelectric conversion vibrator is so formed that the maximum flexural stress on the fixed ends can be uniformly generated on the overall surface of the piezoelectric conversion vibrator, whereby a voltage generated in the piezoelectric conversion vibrator can be substantially doubled as compared with a case where the same has a constant width from the fixed ends toward the free end. Japanese Patent Laying-Open No. 10-174462 describes no deformed shape of the piezoelectric conversion vibrator so formed that the width thereof is reduced from the fixed ends toward the free end.

Each of the aforementioned Japanese Patent No. 4092283, Japanese Patent Laying-Open Nos. 2007-312465 and 2006-293116, Japanese Patent No. 3956933 and Japanese Patent Laying-Open No. 2007-10823 discloses a drive unit or the like including a mirror portion, a beam portion connected to the mirror portion and a driving portion connected with the beam portion and having a constant width in plan view.

When the actuator according to the aforementioned Japanese Patent Laying-Open No. 2005-333048 is applied to a vibrating mirror element, the vibrating mirror element may conceivably be so formed that a mirror portion is arranged on the central portion of the driving arm while the driving arm is vertically deflected to vary a position for reflecting light on the mirror portion. When the actuator according to the aforementioned Japanese Patent Laying-Open No. 2005-333048 is applied to the vibrating mirror element, however, the driving arm and the mirror portion may conceivably not be resonatable due to the driving electrodes directly provided on the lower surface of the driving arm. Therefore, the angle of inclination of the mirror portion may conceivably be disadvantageously reduced.

The aforementioned Japanese Patent Laying-Open No. 10-174462 describes no deformed shape of the piezoelectric conversion vibrator. When the piezoelectric conversion vibrator according to the aforementioned Japanese Patent Laying-Open No. 10-174462 is applied to a vibrating mirror element, therefore, the vibrating mirror element may conceivably be so formed that a mirror portion is arranged in place of the weight provided on the forward end portion of the piezoelectric conversion vibrator while the piezoelectric conversion vibrator is deformed by applying a voltage thereto. Thus, the mirror portion can be inclined by deformation of the piezoelectric conversion vibrator. When the piezoelectric conversion vibrator according to the aforementioned Japanese Patent Laying-Open No. 10-174462 is applied to the vibrating mirror element, however, the mirror portion may conceivably not be resonatable since the same is directly provided on the forward end portion of the piezoelectric conversion vibrator. Therefore, the angle of inclination of the mirror portion may conceivably be disadvantageously reduced.

In the drive unit or the like described in each of the aforementioned Japanese Patent No. 4092283, Japanese Patent Laying-Open Nos. 2007-312465 and 2006-293116, Japanese Patent No. 3956933 and Japanese Patent Laying-Open No. 2007-10823, the driving portion having the constant width in plan view may conceivably be mainly deformable only in the vertical direction. Therefore, no torsional deformation is caused on the driving portion, and hence the angle of inclination of the mirror portion is disadvantageously reduced.

SUMMARY OF THE INVENTION

The present invention has been proposed in order to solve the aforementioned problems, and an object of the present invention is to provide a vibrating mirror element capable of enlarging the angle of inclination of a mirror portion.

A vibrating mirror element according to an aspect of the present invention includes a mirror portion reflecting light, a torsionally deformable beam portion connected to the mirror portion for supporting the mirror portion in a vibratile manner, and a driving portion having a connecting portion connected with the beam portion for driving the mirror portion through the torsionally deformable beam portion, while the width of the connecting portion of the driving portion is rendered smaller than the width of a portion of the driving portion other than the connecting portion in plan view.

In the vibrating mirror element according to this aspect, as hereinabove described, the width of the connecting portion of the driving portion is rendered smaller than the width of the portion of the driving portion other than the connecting portion so that the connecting portion of the driving portion having the small width is easily torsionally deformed by deflection in a direction orthogonal to the longitudinal direction, whereby the quantity of torsional deformation of the connecting portion can be increased when the driving portion is deformed while the beam portion is connected to the connecting portion. Thus, the beam portion connected to the connecting portion of the driving portion can be largely inclined and torsionally deformed, whereby the angle of inclination of the mirror portion connected to the beam portion can be enlarged. Further, the mirror portion is not directly arranged on the driving portion and the driving portion is not directly arranged on the beam portion, whereby the mirror portion can be resonated. Thus, the angle of inclination of the mirror portion can be further enlarged.

In the vibrating mirror element according to the aforementioned aspect, the connecting portion of the driving portion is preferably formed on an end portion of the driving portion.

According to this structure, the quantity of deformation from a reference portion is increased on the end portion of the driving portion beyond that on a portion other than the end portion, whereby the angle of inclination of the mirror portion can be further enlarged by providing the connecting portion on the end portion.

In the vibrating mirror element according to the aforementioned aspect, the beam portion is preferably connected with the driving portion from a direction orthogonal to the longitudinal direction of the driving portion on the connecting portion, and a side surface of the driving portion opposite to the connecting portion is preferably formed to extend in a direction parallel to the longitudinal direction of the driving portion. According to this structure, a side surface of the driving portion closer to the connecting portion is inclined along the longitudinal direction of the driving portion so that the width of the connecting portion of the driving portion is smaller than the width of the portion of the driving portion other than the connecting portion. Thus, the connecting portion can be torsionally deformed to be deflected oppositely to the beam portion, whereby the angle of inclination of the mirror portion can be further enlarged.

In this case, the side surface of the driving portion closer to the connecting portion is preferably formed to protrude toward the side of the beam portion in plan view. According to this structure, the connecting portion can be torsionally deformed to be further deflected oppositely to the beam portion, whereby the angle of inclination of the mirror portion can be further enlarged.

In the vibrating mirror element according to the aforementioned aspect, the beam portion preferably includes a pair of first beam portions having first end portions connected with both sides of the mirror portion respectively and a pair of second beam portions connected with second end portions of the pair of first beam portions respectively, the driving portion preferably includes a first driving portion having a pair of first connecting portions connected with first end portions of the pair of second beam portions respectively and a second driving portion having a pair of second connecting portions connected with second end portions of the pair of second beam portions respectively, and the widths of the pair of first connecting portions of the first driving portion are preferably rendered smaller than the width of a portion of the first driving portion other than the pair of first connecting portions respectively, while the widths of the pair of second connecting portions of the second driving portion are preferably rendered smaller than the width of a portion of the second driving portion other than the pair of second connecting portions respectively. According to this structure, the mirror portion can be inclined through the pair of second beam portions and the pair of first beam portions by deformation of the first driving portion and the second driving portion, whereby the mirror portion can be vibrated by alternately changing the direction for inclining the mirror portion. Further, the pair of first connecting portions and the pair of second connecting portions of the first and second driving portions having the small widths are easily torsionaly deformed by deflection in the direction orthogonal to the longitudinal direction respectively, whereby the quantities of torsional deformation of the pair of first connecting portions and the pair of second connecting portions can be increased when the first and second driving portions are deformed while the pair of second beam portions are connected to the pair of first connecting portions and the pair of second connecting portions respectively. Thus, the pair of second beam portions connected to the pair of first connecting portions and the pair of second connecting portions of the first and second driving portions respectively can be largely inclined and torsionally deformed, whereby the angle of inclination of the mirror portion connected to the pair of first beam portions connected with the pair of second beam portions can be enlarged.

In this case, the pair of first connecting portions of the first driving portion are preferably formed on both end portions of the first driving portion respectively, while the pair of second connecting portions of the second driving portion are preferably formed on both end portions of the second driving portion respectively. According to this structure, the quantities of deflection from reference portions are increased on both end portions of the first and second driving portions beyond those on portions other than both end portions respectively, whereby the angle of inclination of the mirror portion can be further enlarged by providing the pair of first connecting portions and the pair of second connecting portions on both end portions of the first and second driving portions respectively.

In the aforementioned vibrating mirror element provided with the beam portion including the pair of first beam portions and the pair of second beam portions and the driving portion including the first driving portion and the second driving portion, the pair of first beam portions are preferably formed to extend on a straight line passing through the center of the mirror portion toward one side of the mirror portion and toward another side of the mirror portion respectively, and a side surface of the first driving portion opposite to the connecting portion and a side surface of the second driving portion opposite to the connecting portion are preferably formed to extend in a direction parallel to the straight line passing through the center of the mirror portion respectively. According to this structure, the angle of inclination of the mirror portion can be further enlarged as compared with a case where the pair of first beam portions are not arranged on the straight line passing through the center of the mirror portion while the side surface of the first driving portion opposite to the connecting portion and the side surface of the second driving portion opposite to the connecting portion are formed to extend in directions parallel with each other, whereby inclination of the mirror portion can be more reliably controlled.

The vibrating mirror element according to the aforementioned aspect preferably further includes a fixed portion provided in the vicinity of a central portion of the driving portion in the longitudinal direction for constituting a fixed end in vibration of the driving portion, and the driving portion is preferably so formed that the width thereof is gradually reduced from a portion in the vicinity of the fixed portion toward the connecting portion of the driving portion in plan view. According to this structure, the width on the fixed end of the driving portion can be enlarged, whereby the driving portion can be stably driven in a fixed state. Further, the fixed portion is so provided in the vicinity of the central portion of the driving portion in the longitudinal direction that the distances between the fixed portion and both connecting portions can be rendered identical to each other when the connecting portions are provided on both end portions, whereby the quantities of deformation on both connecting portions can be rendered identical to each other. Thus, the quantities of deformation applied to the beam portion can be inhibited from differing from each other due to different quantities of deformation on both end portions of the driving portion, whereby breakage of the beam portion can be suppressed. Further, the width of the driving portion is so gradually reduced that the portion of the driving portion varying in width can be prevented from application of stress resulting from remarkable change of the width.

In this case, the driving portion is preferably so formed that the width thereof is continuously reduced from the portion in the vicinity of the fixed portion toward the connecting portion of the driving portion in plan view. According to this structure, the portion of the driving portion varying in width can be more prevented from application of stress.

In the aforementioned vibrating mirror element having the driving portion so formed that the width thereof is continuously reduced, a side surface of the driving portion closer to the connecting portion is preferably formed to linearly extend in a state inclined with respect to the longitudinal direction of the driving portion in plan view. According to this structure, the width of the driving portion substantially constantly changes, whereby the portion of the driving portion varying in width can be more prevented from application of stress.

In the aforementioned vibrating mirror element having the driving portion so formed that the width thereof is gradually reduced, the driving portion is preferably so formed that the width thereof is reduced stepwise from the portion in the vicinity of the fixed portion toward the connecting portion of the driving portion in plan view. According to this structure, the beam portion can be easily deformed, whereby the angle of inclination of the mirror portion can be further enlarged.

In the aforementioned vibrating mirror element having the driving portion so formed that the width thereof is reduced stepwise, a side surface of the driving portion closer to the connecting portion is preferably formed to have a step in plan view. According to this structure, the end portion can be torsionally deformed to be deflected oppositely to the beam portion on the step, whereby the beam portion can be more easily deformed. Thus, the angle of inclination of the mirror portion can be further enlarged.

In the aforementioned vibrating mirror element having the driving portion so formed that the width thereof is gradually reduced, the width of the beam portion is preferably rendered smaller than the width of at least the portion of the driving portion in the vicinity of the fixed portion. According to this structure, the beam portion can be easily deformed, whereby vibration of the mirror portion can be enlarged.

In the vibrating mirror element according to the aforementioned aspect, the driving portion is preferably formed to be substantially symmetrical to a straight line passing through a substantially central portion of the driving portion in the longitudinal direction and extending in the short-side direction of the driving portion in plan view. According to this structure, the quantities of deformation on both end portions can be reliably rendered identical to each other, whereby the quantities of deformation applied to the beam portion can be more inhibited from differing from each other due to different quantities of deformation on both end portions of the driving portion. Thus, breakage of the beam portion can be more suppressed.

In the vibrating mirror element according to the aforementioned aspect, the connecting portion of the driving portion is preferably formed as a free end, and the beam portion connected to the connecting portion of the driving portion is preferably inclined and torsionally deformed by flexural deformation and torsional deformation of the driving portion. According to this structure, the portion of the driving portion connected with the beam portion serves as the free end, whereby the quantity of deformation of the connecting portion can be further increased.

In the vibrating mirror element according to the aforementioned aspect, the mirror portion and the beam portion are preferably integrally formed. According to this structure, connecting portions of the mirror portion and the beam portion may not be additionally bonded to each other, whereby the mirror portion and the beam portion can be easily formed, and the connecting portions can be inhibited from detachment resulting from deformation of the driving portion.

In this case, the driving portion preferably includes a movable portion integrally formed with the mirror portion and the beam portion and a driving element formed on the surface of the movable portion. According to this structure, connecting portions of the beam portion and the driving portion may not be additionally bonded to each other, whereby the connecting portions of the beam portion and the driving portion can be inhibited from detachment resulting from deformation of the driving portion.

In the vibrating mirror element according to the aforementioned aspect, the driving portion preferably includes a movable portion connected with the beam portion and a driving element formed substantially over the entire surface of the movable portion. According to this structure, driving force of the driving portion can be enlarged, whereby the angle of inclination of the mirror portion can be further enlarged.

In the vibrating mirror element according to the aforementioned aspect, the driving portion preferably includes a first driving portion connected with a first end portion of the beam portion and driven by application of a voltage and a second driving portion connected with a second end portion of the beam portion and driven by application of a voltage, the mirror portion and the beam portion are preferably formed to resonate at a prescribed resonance frequency, and the first driving portion and the second driving portion are preferably formed to be deformed in opposite directions by application of voltages having frequencies substantially identical to the prescribed resonance frequency and having phases reverse to each other respectively. According to this structure, the first and second driving portions can be deformed in electrically opposite directions while the resonance frequency of the mirror portion and the beam portion and the frequencies of the first and second driving portions are substantially identical to each other, whereby the angle of inclination of the mirror portion can be further enlarged.

The vibrating mirror element according to the aforementioned aspect preferably further includes an outer beam portion connected to the driving portion and torsionally deformable and an outer driving portion having an outer connecting portion connected with the outer beam portion for driving the mirror portion. According to this structure, the mirror portion can be two-dimensionally inclined.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a vibrating mirror element 10 according to the embodiment of the present invention is described with reference to FIGS. 1 to 6.

Figure 1:
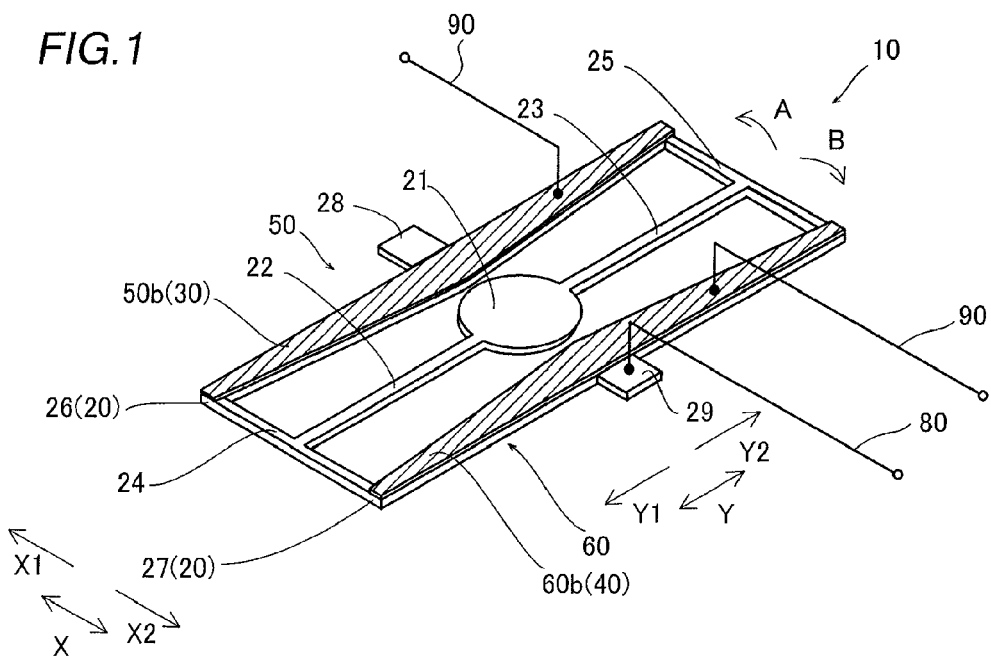
FIG. 1 is a perspective view showing the overall structure of a vibrating mirror element according to an embodiment of the present invention.
Figure 2:
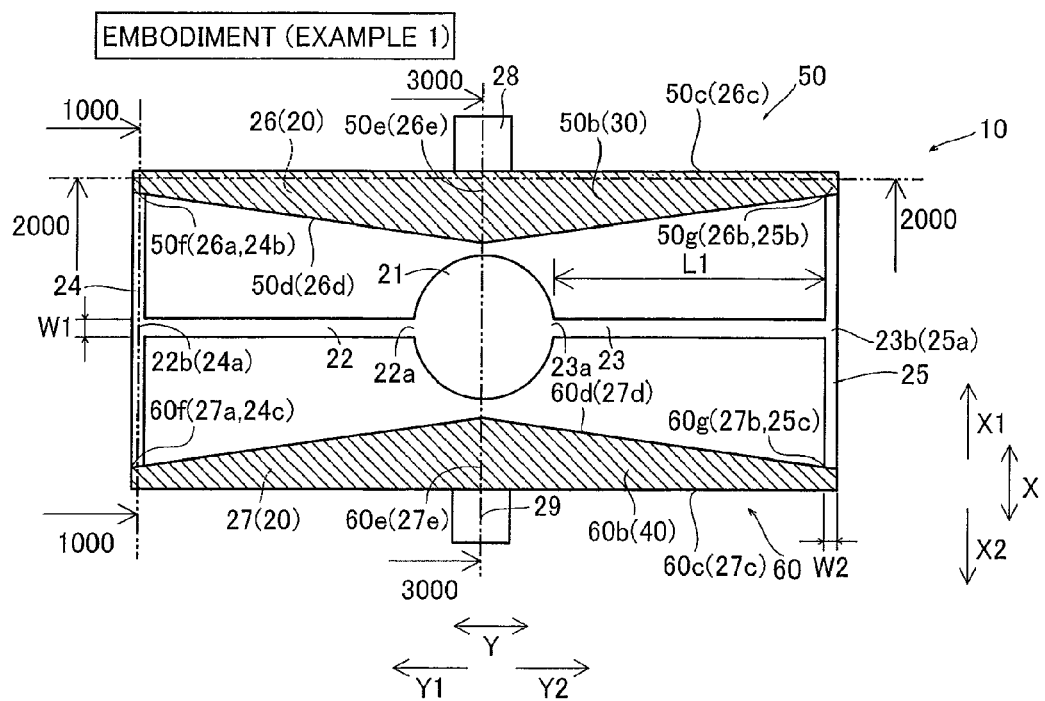
FIG. 2 is a plan view showing the overall structure of the vibrating mirror element according to the embodiment of the present invention.
Figure 3:
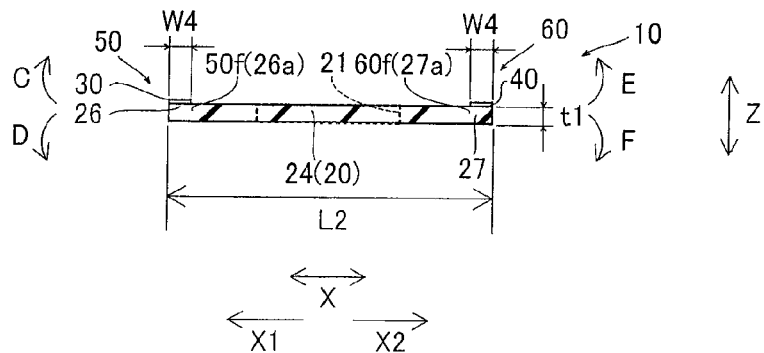
FIG. 3 is a sectional view of the vibrating mirror element taken along the line 1000-1000 in FIG. 2.
Figure 4:
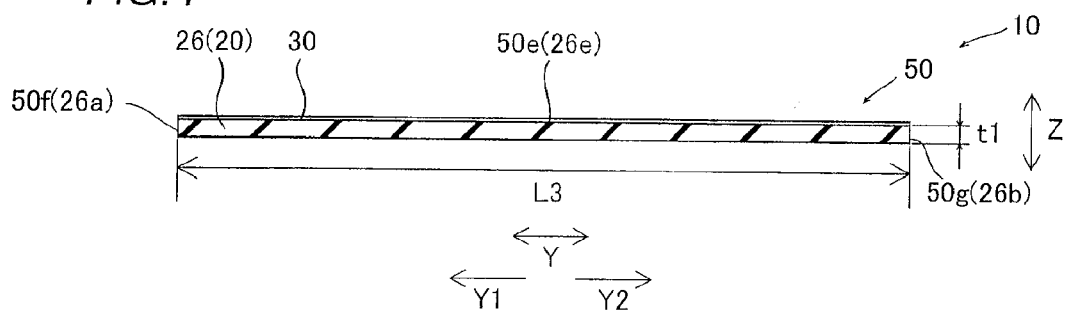
FIG. 4 is a sectional view of the vibrating mirror element taken along the line 2000-2000 in FIG. 2.
Figure 5:
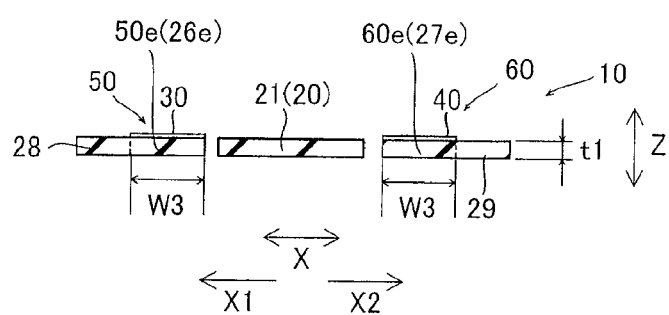
FIG. 5 is a sectional view of the vibrating mirror element taken along the line 3000-3000 in FIG. 2.

The vibrating mirror element 10 according to the embodiment of the present invention is constituted of a substrate 20 and piezoelectric elements 30 and 40 arranged on the substrate 20, as shown in FIGS. 1 and 2. The substrate 20 includes a mirror portion 21 reflecting light, torsion bars 22 and 23 having identical shapes, bars 24 and 25 having identical shapes, a movable portion 26 formed on the side of a direction X1, and another movable portion 27, having a shape identical to that of the movable portion 26, formed on the side of a direction X2. The torsion bar 22 and the bar 24 are formed on the side of the mirror portion 21 in a direction Y1, while the torsion bar 23 and the bar 25 are formed on the side of the mirror portion 21 in a direction Y2. The substrate 20 further includes fixed portions 28 and 29 on the side of the movable portion 26 in the direction X1 and on the side of the movable portion 27 in the direction X2 respectively. In other words, the mirror portion 21, the torsion bars 22 and 23, the bars 24 and 25, the movable portions 26 and 27 and the fixed portions 28 and 29 are integrally formed. The substrate 20 has a thickness t1 of about 60 μm in a direction Z, as shown in FIGS. 3 to 5. The torsion bars 22 and 23 are examples of the "first beam portion" and the "beam portion" in the present invention respectively, and the bars 24 and 25 are examples of the "second beam portion" and the "beam portion" in the present invention respectively.

As shown in FIG. 2, the mirror portion 21 of the substrate 20 has a circular shape of about 1.0 mm in diameter in plan view. The mirror portion 21 is connected with an end portion 22a of the torsion bar 22 on the side of the direction Y2 on the side of the direction Y1 of a straight line passing through the center of the mirror portion 21 and extending in the direction Y, and connected with an end portion 23a of the torsion bar 23 on the side of the direction Y1 on the side of the direction Y2 of the straight line. The torsion bars 22 and 23 are formed to extend on the straight line passing through the center of the mirror portion 21 and extending in the direction Y respectively. The mirror portion 21 is inclined by the torsion bars 22 and 23 in directions A and B (see FIG. 1), and supported by the torsion bars 22 and 23 to be vibratile. The torsion bars 22 and 23 are formed to be torsionally deformable and resonatable with the mirror portion 21. Thus, the mirror portion 21 is formed to be inclined by resonance in excess of the angle of inclination of the bars 24 and 25. As a result, the mirror portion 21 is so formed that, when a laser beam or the like is applied to the mirror portion 21, the angle of reflection of reflected light varies with the angle of inclination of the mirror portion 21. The torsion bars 22 and 23 have a length L1 of about 1.9 mm in the direction Y and a width W1 of about 150 μm in the direction X respectively. The length L1 of the torsion bars 22 and 23 in the direction Y may simply be at least about 1.4 mm and not more than about 1.9 mm, and the width W1 of the torsion bars 22 and 23 in the direction X may simply be at least about 100 μm and not more than about 250 μm.

The bar 24 is perpendicularly connected with an end portion 22b of the torsion bar 22 on the side of the direction Y1 on a central portion 24a of the bar 24 in the direction X in plan view. The bar 25 is perpendicularly connected with an end portion 23b of the torsion bar 23 on the side of the direction Y2 on a central portion 25a of the bar 25 in the direction X in plan view. The bars 24 and 25 have a length L2 of about 1.9 mm in the direction X as shown in FIG. 3, and have a width W2 of about 100 μm in the direction Y as shown in FIG. 2. The length L2 of the bars 24 and 25 in the direction X may simply be at least about 1.5 mm and not more than about 2.2 mm, and the width W2 of the bars 24 and 25 in the direction Y may simply be at least about 100 μm and not more than about 250 μm. The bars 24 and 25 are formed to be inclinable in the direction X and torsionally deformable by deformation of the movable portions 26 and 27 (driving portions 50 and 60 described later).

As shown in FIG. 2, the movable portions 26 and 27 are formed to extend in the direction Y which is the longitudinal direction. As shown in FIG. 4, the movable portions 26 and 27 (see FIG. 2) have a length L3 of about 5.0 mm in the direction Y respectively. The length L3 of the movable portions 26 and 27 in the direction Y may simply be at least about 4.0 mm and not more than about 6.0 mm.

According to this embodiment, an end portion 24b of the bar 24 on the side of the direction X1 and an end portion 25b of the bar 25 on the side of the direction X1 are perpendicularly connected with end portions 26a and 26b of the movable portion 26 on the sides of the directions Y1 and Y2 respectively in plan view, as shown in FIG. 2. An end portion 24c of the bar 24 on the side of the direction X2 and an end portion 25c of the bar 25 on the side of the direction X2 are perpendicularly connected with end portions 27a and 27b of the movable portion 27 on the sides of the directions Y1 and Y2 respectively in plan view. Thus, the bar 24 is connected to the end portions 26a and 27a of the movable portions 26 and 27 on the side of the direction Y1 respectively, while the bar 25 is connected to the end portions 26b and 27b of the movable portions 26 and 27 on the side of the direction Y2 respectively. The bars 24 and 25 are connected to intersect (direction X) with the longitudinal direction of the movable portions 26 and 27 respectively.

According to this embodiment, a side surface portion 26c of the movable portion 26 on the side of the direction X1 is formed to linearly extend in the direction Y parallelly to the straight line passing through the center of the mirror portion 21 and extending in the direction Y. A side surface portion 26d of the movable portion 26 on the side of the direction X2 is formed to be continuously and linearly inclined in the direction X1 from a central portion 26e toward the end portions 26a and 26b of the movable portion 26. The movable portion 26 is so formed that the side of the direction Y1 and the side of the direction Y2 are mirror-symmetrical with respect to the central portion 26e. In other words, the movable portion 26 is so formed that the width thereof is gradually reduced from the central portion 26e toward the end portions 26a and 26b. The width of the end portion 26a in the direction X is identical to the width of the end portion 26b in the direction X, and the movable portion 26 is so formed that the width thereof is minimized in the direction X. The width W3 of the central portion 26e in the direction X is about 500 μm as shown in FIG. 5, while the width W4 of the end portions 26a and 26b (see FIG. 2) of the movable portion 26 in the direction X is about 150 μ, as shown in FIG. 3. In other words, the movable portion 26 is so shaped that the central portion 26e protrudes toward the side of the direction X2 where the torsion bars 22 and 23 and the bars 24 and 25 are positioned.

According to this embodiment, a side surface portion 27c of the movable portion 27 on the side of the direction X2 is formed to linearly extend in the direction Y parallelly to the straight line passing through the center of the mirror portion 21 and extending in the direction Y. A side surface portion 27d of the movable portion 27 on the side of the direction X1 is formed to be continuously and linearly inclined in the direction X2 from a central portion 27e toward the end portions 27a and 27b of the movable portion 27. The movable portion 27 is so formed that the side of the direction Y1 and the side of the direction Y2 are mirror-symmetrical with respect to the central portion 27e. In other words, the movable portion 27 is so formed that the width thereof is gradually reduced from the central portion 27e toward the end portions 27a and 27b. The width of the end portion 27a in the direction X is identical to the width of the end portion 27b in the direction X, and the movable portion 27 is so formed that the width thereof is minimized in the direction X. The width W3 of the central portion 27e in the direction X is about 500 μm as shown in FIG. 5, while the width W4 of the end portions 27a and 27b (see FIG. 2) of the movable portion 27 in the direction X is about 150 μm, as shown in FIG. 3. In other words, the movable portion 27 is so shaped that the central portion 27e protrudes toward the side of the direction X1 where the torsion bars 22 and 23 and the bars 24 and 25 are positioned.

The widths W3 of the central portions 26e and 27e of the movable portions 26 and 27 in the direction X may simply be at least about 500 μm and not more than about 900 μm respectively, and the width W4 of the end portions 26a and 26b of the movable portion 26 in the direction X and the width W4 of the end portions 27a and 27b of the movable portion 27 in the direction X may simply be at least about 150 μm and not more than about 300 μm respectively.

The width W1 of the torsion bars 22 and 23 and the width W2 of the bars 24 and 25 are rendered smaller than the width W3 of the central portions 26e and 27e of the movable portions 26 and 27.

As shown in FIG. 2, the fixed portion 28 protruding in the direction X1 is formed on the side surface portion 26c of the central portion 26e of the movable portion 26 on the side of the direction X1. The fixed portion 29 protruding in the direction X2 is formed on the side surface portion 27c of the central portion 27e of the movable portion 27 on the side of the direction X2. The fixed portions 28 and 29 are positioned on the sides of the mirror portion 21 in the directions X1 and X2 respectively, and so formed that the centers of the fixed portions 28 and 29 are positioned on a line extending from the center of the mirror portion 21 in the direction X respectively. Further, the central portions 26e and 27e of the movable portions 26 and 27 are also positioned on the line extending from the center of the mirror portion 21 in the direction X.

The fixed portions 28 and 29 are fixed to bases (not shown) with an ultraviolet curing adhesive or the like respectively, formed to function as fixed ends when the movable portions 26 and 27 (driving portions 50 and 60) are concavely or convexly deformed to vibrate, and provided in the vicinity of central portions 50e and 60e, described later, of the driving portions 50 and 60 respectively.

Figure 6:
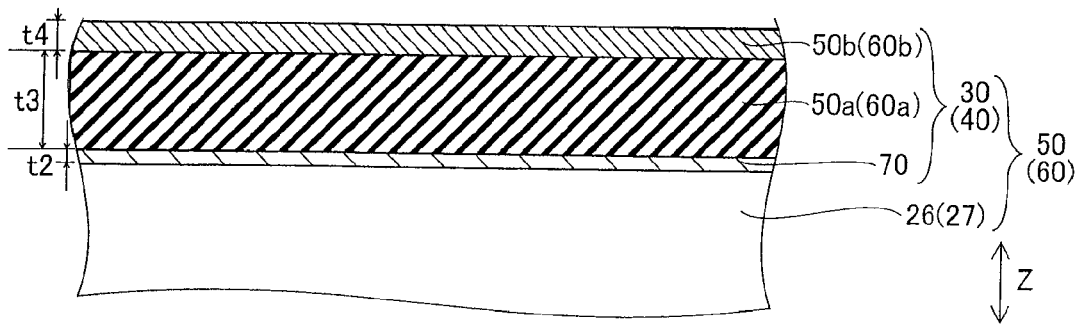
FIG. 6 is an enlarged sectional view showing a portion around a piezoelectric element of the vibrating mirror element shown in FIGS. 3 to 5.

As shown in FIGS. 3 and 5, piezoelectric elements 30 and 40 are formed substantially on the overall upper surfaces of the movable portions 26 and 27 of the substrate 20 respectively. The movable portion 26 and the piezoelectric element 30 form the driving portion 50, while the movable portion 27 and the piezoelectric element 40 form the driving portion 60. More specifically, a lower electrode 70 having a thickness t2 of about 120 nm in the direction Z is formed on the upper surfaces of the movable portions 26 and 27 of the substrate 20, as shown in FIG. 6. The lower electrode 70 is formed not only on the upper surfaces of the movable portions 26 and 27, but also over the entire surface of the substrate 20. Thus, the piezoelectric elements 30 and 40 can be wired to the lower electrode 70 on arbitrary portions of the substrate 20. As shown in FIG. 1, the lower electrode 70 is electrically connected with an external device by a terminal 80 on the upper surface of the fixed portion 29.

Piezoelectric bodies 50a and 60a having a thickness t3 of about 3 μm in the direction Z are formed substantially over the entire upper surfaces of portions of the lower electrode 70 located on the upper surfaces of the movable portions 26 and 27 respectively. The piezoelectric bodies 50a and 60a are made of lead zirconate titanate (PZT), and polarized in the thickness direction (direction Z), to be expanded/contracted in the direction Y (see FIG. 4) when voltages are applied thereto.

Upper electrodes 50b and 60b having a thickness t4 of about 500 nm in the direction Z are formed substantially over the entire upper surfaces of the piezoelectric bodies 50a and 60a respectively. The lower electrode 70, the piezoelectric body 50a and the upper electrode 50b form the piezoelectric element 30 on the side of the vibrating mirror element 10 in the direction X1 (see FIG. 3), while the movable portion 26 and the piezoelectric element 30 form the driving portion 50. On the other hand, the lower electrode 70, the piezoelectric element 60a and the upper electrode 60b form the piezoelectric element 40 on the side of the vibrating mirror element 10 in the direction X2 (see FIG. 3), while the movable portion 27 and the piezoelectric element 40 form the driving portion 60. As shown in FIG. 1, the upper electrodes 50b and 60b are electrically connected with external devices by terminals 90 respectively. The driving portion 50 is an example of the "first driving portion" in the present invention, and the driving portion 60 is an example of the "second driving portion" in the present invention.

According to this embodiment, the driving portions 50 and 60 have shapes identical to those of the movable portions 26 and 27 in plan view, as shown in FIG. 2. Namely, a side surface portion 50c of the driving portion 50 on the side of the direction X1 is formed to linearly extend in the direction Y, while a side surface portion 50d on the side of the direction X2 is formed to be continuously inclined in the direction X1 from the central portion 50e toward end portions 50f and 50g. In other words, the driving portion 50 is so formed that the width thereof is reduced from the central portion 50e toward the end portions 50f and 50g. The width of the end portion 50f in the direction X is identical to the width of the end portion 50g in the direction X, and is minimized on the driving portion 50. The side surface portion 50c is an example of the "side surface" in the present invention.

A side surface portion 60c of the driving portion 60 on the side of the direction X2 is formed to linearly extend in the direction Y, while a side surface portion 60d on the side of the direction X1 is formed to be continuously inclined in the direction X2 from the central portion 60e toward end portions 60f and 60g. In other words, the driving portion 60 is so formed that the width thereof is reduced from the central portion 60e toward the end portions 60f and 60g. The width of the end portion 60f in the direction X is identical to the width of the end portion 60g in the direction X, and minimized on the driving portion 60. The side surface portion 60c is an example of the "side surface" in the present invention.

According to this embodiment, the bar 24 is connected to the end portions 50f and 60f corresponding to the end portions 26a and 27b of the movable portions 26 and 27 on the side of the direction Y1 respectively, while the bar 25 is connected to the end portions 50g and 60g corresponding to the end portions 26b and 27b of the movable portions 26 and 27 on the side of the direction Y2 respectively. The end portions 50f and 50g are examples of the "first connecting portion" and the "connecting portion" in the present invention respectively, and the end portions 60f and 60g are examples of the "second connecting portion" and the "connecting portion" in the present invention respectively.

The central portions 50e and 60e are formed to serve as fixed ends of the driving portions 50 and 60 respectively, due to the fixed portions 28 and 29 provided in the vicinity of the central portions 50e and 60e, described later, of the driving portions 50 and 60 respectively. The driving portion 50 has a substantially symmetrical shape with respect to a straight line (line 3000-3000 in FIG. 2) passing through the central portion 50e and extending in the direction Y, while the driving portion 60 has a substantially symmetrical shape with respect to a straight line (line 3000-3000 in FIG. 2) passing through the central portion 60e and extending in the direction Y.

According to this embodiment, the driving portions 50 and 60 are formed to be concavely and convexly deformable in the direction Z with fixed ends defined by the central portions 50e and 60e in the vicinity of the fixed portions 28 and 29 and free ends defined by the end portions 50f and 60f of the driving portions 50 and 60 on the side of the direction Y1 and the end portions 50g and 60g on the side of the direction Y2 when voltages are applied to the upper electrodes 50b and 60b (see FIG. 6) and the lower electrode 70 (see FIG. 6). More specifically, when voltages for contracting the piezoelectric bodies 50a and 60a are applied to the upper electrodes 50b and 60b and the lower electrode 70, the piezoelectric bodies 50a and 60a arranged on the upper surfaces of the movable portions 26 and 27 are deformed to warp the end portions 50f, 50g, 60f and 60g serving as the free ends upward. Thus, the driving portions 50 and 60 are so concavely deformed that the central portions 50e and 60e serving as the fixed ends are positioned below the end portions 50f, 50g, 60f and 60g serving as the free ends.

When voltages for expanding the piezoelectric bodies 50a and 60a are applied to the upper electrodes 50b and 60b and the lower electrode 70, on the other hand, the piezoelectric bodies 50a and 60a arranged on the upper surfaces of the movable portions 26 and 27 are deformed to warp the end portions 50f, 50g, 60f and 60g serving as the free ends downward. Thus, the driving portions 50 and 60 are so convexly deformed that the central portions 50e and 60e serving as the fixed ends are positioned above the end portions 50f, 50g, 60f and 60g serving as the free ends.

According to this embodiment, the driving portion 50 is so formed that the width thereof is continuously reduced from the central portion 50e toward the end portions 50f and 50g. When the driving portion 50 is concavely deformed, therefore, force in a direction C is applied to the end portions 50f and 50g (see FIG. 2) of the driving portion 50 to twist the same in the direction C, as shown in FIG. 3. When the driving portion 50 is convexly deformed, on the other hand, force in a direction D is applied to the end portions 50f and 50g of the driving portion 50 to twist the same in the direction D.

According to this embodiment, further, the driving portion 60 is so formed that the width thereof is continuously reduced from the central portion 60e toward the end portions 60f and 60g, as shown in FIG. 2. When the driving portion 60 is concavely deformed, therefore, force in a direction E is applied to the end portions 60f and 60g (see FIG. 2) of the driving portion 60 to twist the same in the direction E, as shown in FIG. 3. When the driving portion 60 is convexly deformed, on the other hand, force in a direction F is applied to the end portions 60f and 60g of the driving portion 60 to twist the same in the direction F.

The voltages applied to the upper electrodes 50b and 60b and the lower electrode 70 mainly have sinusoidal waveforms. Thus, the driving portions 50 and 60 repeat vibratile movement of being concavely deformed from undeformed states, returning to the undeformed states again and thereafter being convexly deformed. The phases of a voltage V1 applied to the upper electrode 50b of the driving portion 50 and the lower electrode 70 and a voltage V2 applied to the upper electrode 60b of the driving portion 60 and the lower electrode 70 are reverse to each other. Further, the frequencies of the sinusoidal voltages V1 and V2 and the resonance frequency of the mirror portion 21, the torsion bars 22 and 23 and the driving portions 50 and 60 substantially coincide with each other. Thus, the mirror portion 21 and the torsion bars 22 and 23 so resonate that the mirror portion 21 can be vibrated in the directions A and B (see FIG. 1) at an angle larger than the angle of inclination of the bars 24 and 25.

A driving operation of the vibrating mirror element 10 according to the embodiment of the present invention is now described with reference to FIGS. 6 to 12.

Figure 7:
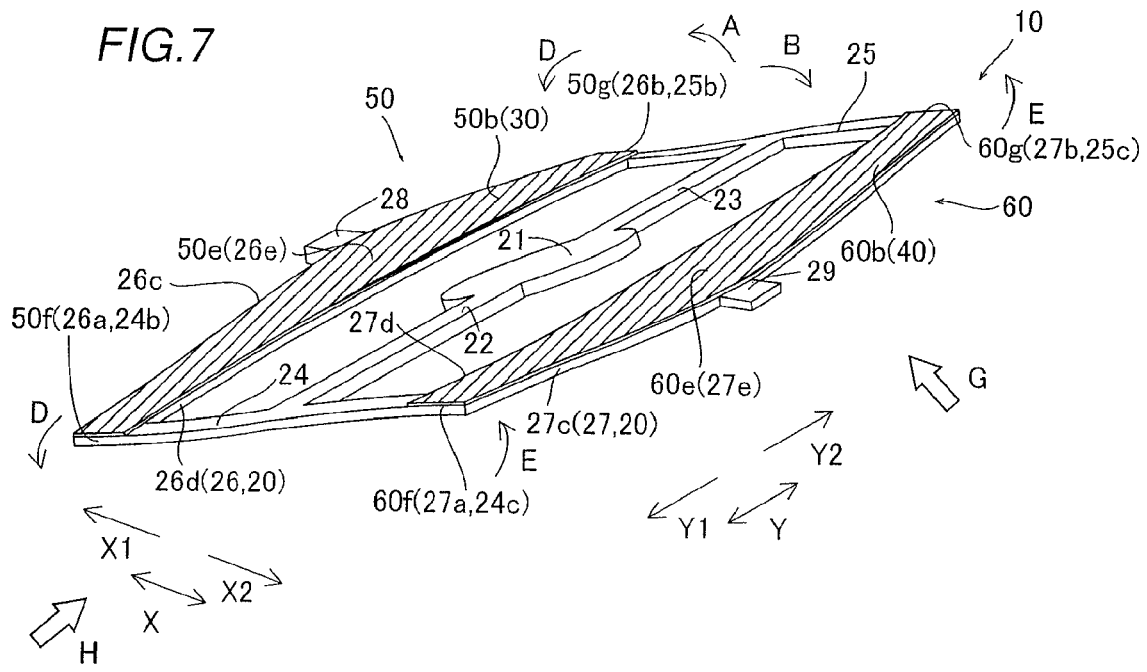
FIG. 7 is a diagram for illustrating a method of driving the vibrating mirror element according to the embodiment of the present invention.
Figure 8:
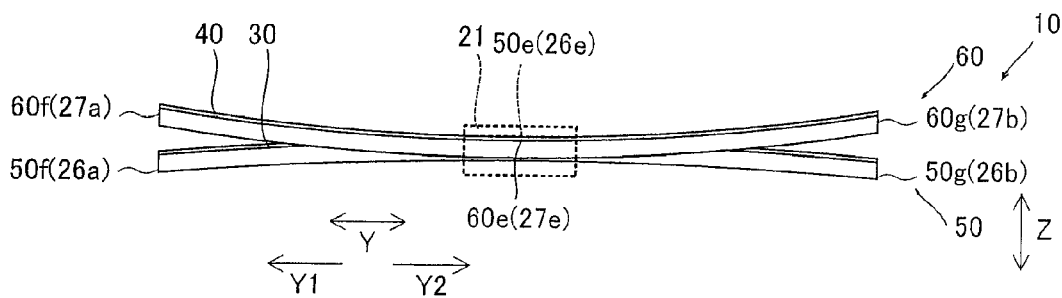
FIG. 8 is a diagram for illustrating the method of driving the vibrating mirror element as viewed from a direction G in FIG. 7.

When the voltage V1 (about 8 V) for expanding the piezoelectric body 50a is applied to the upper electrode 50b and the lower electrode 70 while the voltage V2 (about 8 V) for contracting the piezoelectric body 60a is applied to the upper electrode 60b and the lower electrode 70 as shown in FIG. 6, the driving portion 50 is so convexly deformed that the central portion 50e serving as the fixed end is positioned above the end portions 50f and 50g serving as the free ends and the driving portion 60 is so concavely deformed that the central portion 60e serving as the fixed end is positioned below the end portions 60f and 60g serving as the free ends, as shown in FIGS. 7 and 8.

Figure 9:
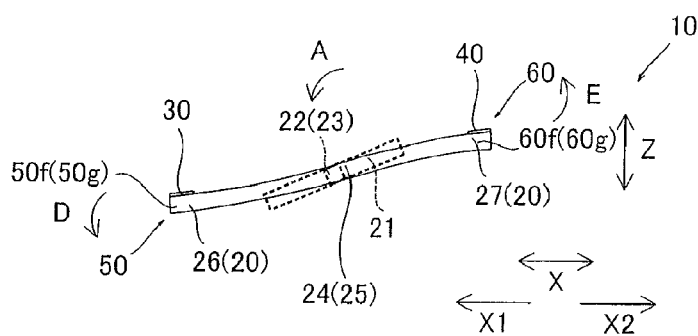
FIG. 9 is a diagram for illustrating the method of driving the vibrating mirror element as viewed from a direction H in FIG. 7.

According to this embodiment, the driving portion 50 is so formed that the width thereof is continuously reduced from the central portion 50e toward the end portions 50f and 50g while the driving portion 60 is so formed that the width thereof is continuously reduced from the central portion 60e toward the end portions 60f and 60g, whereby the end portions 50f and 50g of the driving portion 50 are further twisted in the direction D and the end portions 60f and 60g of the driving portion 60 are further twisted in the direction E, as shown in FIG. 9.

Thus, the end portions 26a and 26b of the movable portion 26 positioned on a lower portion of the driving portion 50 are positioned downward as compared with the end portions 27a and 27b of the movable portion 27 positioned on a lower portion of the driving portion 60 as shown in FIG. 7, whereby the bars 24 and 25 are inclined downward from the side of the movable portion 27 toward the side of the movable portion 26 (direction X1), and torsionally deformed in the direction A. Following inclination of the bars 24 and 25, the torsion bars 22 and 23 are inclined downward from the side of the movable portion 27 toward the side of the movable portion 26 (direction X1). Further, the resonance frequency of the mirror portion 21 and the torsion bars 22 and 23 and the frequencies of the sinusoidal voltages V1 and V2 substantially coincide with each other so that the mirror portion 21 and the torsion bars 22 and 23 resonate (resonance frequency: about 21 kHz), whereby force is applied to the torsion bars 22 and 23 to twist the same in the direction A at an angle larger than the angle of inclination of the bars 24 and 25. Thus, the mirror portion 21 is inclined in the direction A by about 10° at a maximum.

Figure 10:
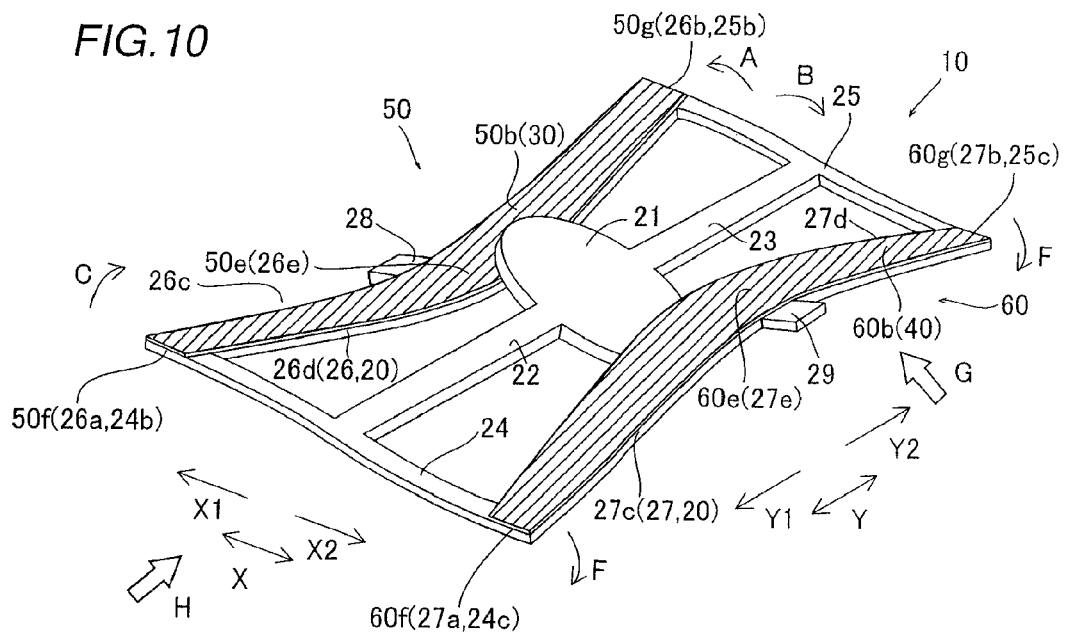
FIG. 10 is a diagram for illustrating the method of driving the vibrating mirror element according to the embodiment of the present invention.
Figure 11:
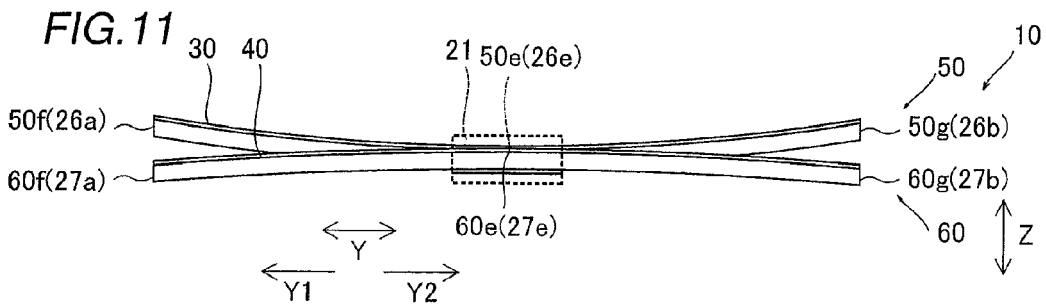
FIG. 11 is a diagram for illustrating the method of driving the vibrating mirror element as viewed from a direction G in FIG. 10.

When the voltage V1 (about 8 V) for contracting the piezoelectric body 50a is applied to the upper electrode 50b and the lower electrode 70 and the voltage V2 (about 8 V) for expanding the piezoelectric body 60a is applied to the upper electrode 60b and the lower electrode 70 as shown in FIG. 6, on the other hand, the driving portion 50 is so concavely deformed that the central portion 50e serving as the fixed end is positioned below the end portions 50f and 50g serving as the free ends and the driving portion 60 is so convexly deformed that the central portion 60e serving as the fixed end is positioned above the end portions 60f and 60g serving as the free ends, as shown in FIGS. 10 and 11.

Figure 12:
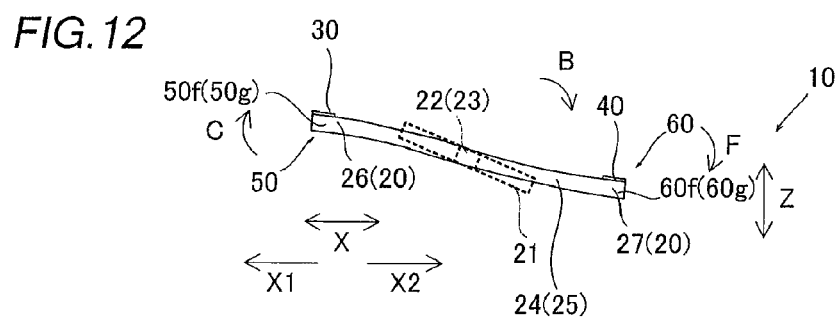
FIG. 12 is a diagram for illustrating the method of driving the vibrating mirror element as viewed from a direction H in FIG. 10.

According to this embodiment, the driving portion 50 is so formed that the width thereof is continuously reduced from the central portion 50e toward the end portions 50f and 50g while the driving portion 60 is so formed that the width thereof is continuously reduced from the central portion 60e toward the end portions 60f and 60g, whereby the end portions 50f and 50g of the driving portion 50 are further twisted in the direction C while the end portions 60f and 60g of the driving portion 60 are further twisted in the direction F, as shown in FIG. 12.

Thus, the end portions 26a and 26b of the movable portion 26 positioned on the lower portion of the driving portion 50 are positioned upward as compared with the end portions 27a and 27b of the movable portion 27 positioned on the lower portion of the driving portion 60 as shown in FIG. 10, whereby the bars 24 and 25 are inclined downward from the side of the movable portion 26 toward the side of the movable portion 27 (direction X2) respectively and torsionally deformed in the direction B. Following inclination of the bars 24 and 25, the torsion bars 22 and 23 are inclined downward from the side of the movable portion 26 toward the side of the movable portion 27 (direction X2). Further, the resonance frequency of the mirror portion 21 and the torsion bars 22 and 23 and the frequencies of the sinusoidal voltages V1 and V2 substantially coincide with each other so that the mirror portion 21 and the torsion bars 22 and 23 resonate (resonance frequency: about 21 kHz), whereby force is applied to the torsion bars 22 and 23 to twist the same in the direction B at an angle larger than the angle of inclination of the bars 24 and 25. Thus, the mirror portion 21 is inclined in the direction B by about 10° at a maximum.

The voltages applied to the upper electrodes 50b and 60b and the lower electrode 70 mainly have sinusoidal waveforms, whereby the driving portions 50 and 60 repeat the vibratile movement of being concavely deformed from the undeformed states, returning to the undeformed states again and thereafter being convexly deformed. Consequently, the sinusoidal voltage V1 (about 8 V) is applied to the upper electrode 50b of the driving portion 50 and the lower electrode 70 while the sinusoidal voltage V2 (about 8 V) having the phase reverse to that of the voltage V1 (about 8 V) is applied to the upper electrode 60b of the driving portion 60 and the lower electrode 70, whereby the mirror portion 21 supported by the torsion bars 22 and 23 in a vibratile manner repeats vibratile movement in the directions A and B at the angle of inclination of about 10° at a maximum through deformation of the driving portions 50 and 60, the bars 24 and 25 and the torsion bars 22 and 23. Thus, the vibrating mirror element 10 can one-dimensionally scan reflected light of a laser beam or the like applied to the mirror portion 21.

According to this embodiment, as hereinabove described, the width W4 of the end portions 50f, 50g, 60f and 60g of the driving portions 50 and 60 is rendered smaller than the width of the portions of the driving portions 50 and 60 other than the end portions 50f, 50g, 60f and 60g so that the end portions 50f, 50g, 60f and 60g of the driving portions 50 and 60 having the small width W4 are easily torsionally deformed by deflection in the direction orthogonal to the longitudinal direction, whereby the quantities of torsional deformation of the end portions 50f, 50g, 60f and 60g can be increased when the driving portions 50 and 60 are deformed while the bars 24 and 25 are connected to the end portions 50f, 50g, 60f and 60g. Thus, the bars 24 and 25 connected to the driving portions 50 and 60 can be largely inclined and torsionally deformed, whereby the angle of inclination of the torsion bars 22 and 23 and that of the mirror portion 21 can be enlarged. Further, the mirror portion 21 is not directly arranged on the driving portions 50 and 60 while the driving portions 50 and 60 are not directly arranged on the bars 24 and 25, whereby the mirror portion 21 can be resonated. Thus, the angle of inclination of the mirror portion 21 can be further enlarged. In addition, the quantities of torsional deformation from reference portions are increased on the end portions 50f, 50g, 60f and 60g of the driving portions 50 and 60 beyond those on portions other than the end portions 50f, 50g, 60f and 60g, whereby the angle of inclination of the mirror portion 21 can be further enlarged by providing the connecting portions on the end portions 50f, 50g, 60f and 60g. Further, the mirror portion 21 can be inclined through the bars 24 and 25 and the torsion bars 22 and 23 by deformation of the driving portions 50 and 60, whereby the mirror portion 21 can be vibrated by alternately changing the direction for inclining the mirror portion 21.

According to this embodiment, as hereinabove described, the bars 24 and 25 are connected with the driving portions 50 and 60 from the direction (direction X) orthogonal to the longitudinal direction of the driving portions 50 and 60 on the end portions 50f, 50g, 60f and 60g while the side surface portions 50c and 60c of the driving portions 50 and 60 are formed to extend in the direction Y, whereby the side surfaces of the driving portions 50 and 60 on the sides of the end portions 50f, 50g, 60f and 60g are inclined along the longitudinal direction (direction Y) of the driving portions 50 and 60 so that the width W4 of the end portions 50f, 50g, 60f and 60g of the driving portions 50 and 60 is smaller than the width of the portions of the driving portions 50 and 60 other than the end portions 50f, 50g, 60f and 60g. Thus, the end portions 50f, 50g, 60f and 60g can be torsionally deformed to be deflected oppositely to the bars 24 and 25, whereby inclination and resonance of the mirror portion 21 can be further enlarged.

According to this embodiment, as hereinabove described, the torsion bars 22 and 23 are formed to extend on the straight line passing through the center of the mirror portion 21 and extending in the direction Y respectively, whereby the angle of inclination of the mirror portion 21 can be more enlarged as compared with a case where the torsion bars 22 and 23 are not arranged on the straight line passing through the center of the mirror portion 21.

According to this embodiment, as hereinabove described, the movable portions 26 and 27 are formed to extend parallelly to the straight line passing through the center of the mirror portion 21 and extending in the direction Y respectively so that the driving force of the driving portions 50 and 60 can be substantially uniformly applied to the mirror portion 21 through the torsion bars 22 and 23, whereby inclination of the mirror portion 21 can be more reliably controlled.

According to this embodiment, as hereinabove described, the driving portions 50 and 60 are so formed that the widths thereof are continuously reduced from the central portions 50e and 60e in the vicinity of the fixed portions 28 and 29 toward the end portions 50f, 50g, 60f and 60g respectively in plan view so that the width W3 of the central portions 50e and 60e of the driving portions 50 and 60 can be increased, whereby the driving portions 50 and 60 can be stably driven in fixed states. Further, the distance between the central portion 50e and the end portion 50f and that between the central portion 50e and the end portion 50g can be rendered identical to each other while the distance between the central portion 60e and the end portion 60f and that between the central portion 60e and the end portion 60g can be rendered identical to each other, whereby the quantities of deformation of the end portions 50f and 50g can be rendered identical to each other while the quantities of deformation of the end portions 60f and 60g can also be rendered identical to each other. Thus, the quantities of deformation applied to the bars 24 and 25 can be inhibited from differing from each other due to different quantities of deformation on the end portions 50f, 50g, 60f and 60g of the driving portions 50 and 60, whereby breakage of the bars 24 and 25 can be suppressed.

According to this embodiment, as hereinabove described, the side surface portion 26c (27c) of the movable portion 26 (27) on the side of the direction X1 (X2) is formed to be continuously and linearly inclined in the direction X1 (X2) from the central portion 26e (27e) toward the end portions 26a (27a) and 26b (27b) of the movable portion 26 (27) so that the width of the driving portion 50 (60) substantially constantly changes, whereby the portion of the driving portion 50 (60) varying in width can be more prevented from application of stress.

According to this embodiment, as hereinabove described, the movable portion 26 is so shaped that the central portion 26e protrudes toward the side of the direction X2 where the torsion bars 22 and 23 and the bars 24 and 25 are positioned while the movable portion 27 is so shaped that the central portion 27e protrudes toward the side of the direction X1 where the torsion bars 22 and 23 and the bars 24 and 25 are positioned so that the end portions 50f, 50g, 60f and 60g of the driving portions 50 and 60 can be torsionally deformed to be more deflected toward the sides of the directions X1 and X2, whereby the angle of inclination of the mirror portion 21 can be further enlarged.

According to this embodiment, as hereinabove described, the width W1 of the torsion bars 22 and 23 and the width W2 of the bars 24 and 25 are rendered smaller than the width W3 of the central portions 26e and 27e of the movable portions 26 and 27 so that the torsion bars 22 and 23 and the bars 24 and 25 can be easily deformed, whereby the angle of inclination of the mirror portion 21 can be further enlarged.

According to this embodiment, as hereinabove described, the end portions 50f, 50g, 60f and 60g of the driving portions 50 and 60 connected with the bars 24 and 25 serve as the free ends while the driving portions 50 and 60 are so flexurally and torsionally deformed that the bars 24 and 25 connected to the end portions 50f, 50g, 60f and 60g are inclined and torsionally deformed, whereby the quantities of deformation of the end portions 50f, 50g, 60f and 60g can be further increased.

According to this embodiment, as hereinabove described, the driving portion 50 has the substantially symmetrical shape with respect to the straight line (line 3000-3000) passing through the central portion 50e and extending in the direction X while the driving portion 60 has the substantially symmetrical shape with respect to the straight line (line 3000-3000) passing through the central portion 60e and extending in the direction X so that the quantities of deformation on the end portions 50f, 50g, 60f and 60g can be reliably rendered identical to each other, whereby the quantities of deformation applied to the bars 24 and 25 can be more inhibited from differing from each other due to different quantities of deformation on the end portions 50f, 50g, 60f and 60g. Thus, breakage of the bars 24 and 25 can be more suppressed.

According to this embodiment, as hereinabove described, the mirror portion 21, the torsion bars 22 and 23, the bars 24 and 25, the movable portions 26 and 27 and the fixed portions 28 and 29 are integrally formed so that connecting portions between the mirror portion 21, the torsion bars 22 and 23, the bars 24 and 25, the movable portions 26 and 27 and the fixed portions 28 and 29 may not be additionally bonded to each other, whereby the mirror portion 21, the torsion bars 22 and 23, the bars 24 and 25, the movable portions 26 and 27 and the fixed portions 28 and 29 can be easily formed, while the respective connecting portions can be inhibited from detachment resulting from deformation of the driving portions 50 and 60.

According to this embodiment, as hereinabove described, the piezoelectric elements 30 and 40 are formed substantially on the overall upper surfaces of the movable portions 26 and 27 respectively so that the driving force of the driving portions 50 and 60 can be enlarged, whereby the angle of inclination of the mirror portion 21 can be further enlarged.

According to this embodiment, as hereinabove described, the sinusoidal voltage V1 (about 8 V) is applied to the upper electrode 50b of the driving portion 50 and the lower electrode 70 while the sinusoidal voltage V2 (about 8 V) having the phase reverse to that of the voltage V1 (about 8 V) is applied to the upper electrode 60b of the driving portion 60 and the lower electrode 70 and the resonance frequency of the mirror portion 21 and the torsion bars 22 and 23 and the frequencies of the sinusoidal voltages V1 and V2 substantially coincide with each other so that the driving portions 50 and 60 can be deformed in electrically opposite directions while the resonance frequency of the mirror portion 21 and the torsion bars 22 and 23 and the frequencies of the sinusoidal voltages V1 and V2 substantially coincide with each other, whereby the angle of inclination of the mirror portion 21 can be further enlarged.

Simulations conducted in order to confirm the effects of the aforementioned embodiment of the present invention are now described with reference to FIGS. 2, 6 and 13 to 16.

In these simulations, Examples 1 and 2 and comparative example 1 were examined. Example 1 corresponds to the vibrating mirror element 10 according to the embodiment of the present invention shown in FIG. 2. In a vibrating mirror element 11 according to Example 2 shown in FIG. 13, the lengths L4 of driving portions 150 and 160 in a direction Y were set to 6.0 mm respectively, while the lengths L5 of torsion bars 122 and 123 in the direction Y were set to 2.4 mm respectively. Further, the widths W5 of end portions 150f, 150g, 160f and 160g, serving as connecting portions between the driving portions 150 and 160 and bars 124 and 125, of the driving portions 150 and 160 in a direction X were set to 250 μm respectively by varying inclination of side surface portions 150d and 160d of the driving portions 150 and 160.

Figure 14:
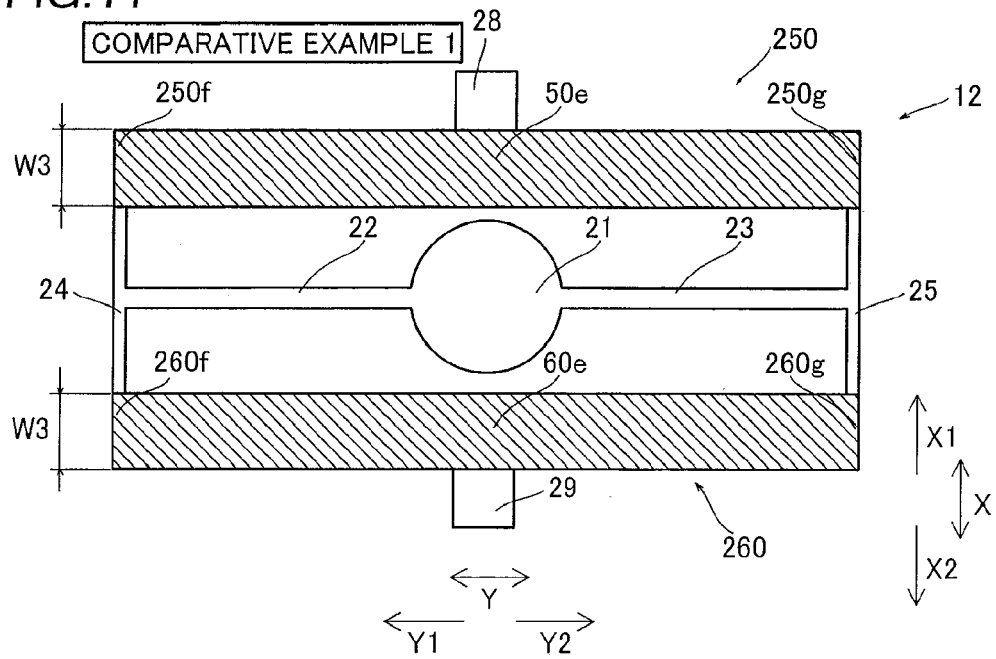
FIG. 14 is a plan view showing the overall structure of a vibrating mirror element according to comparative example 1 of the present invention.
Figure 15:
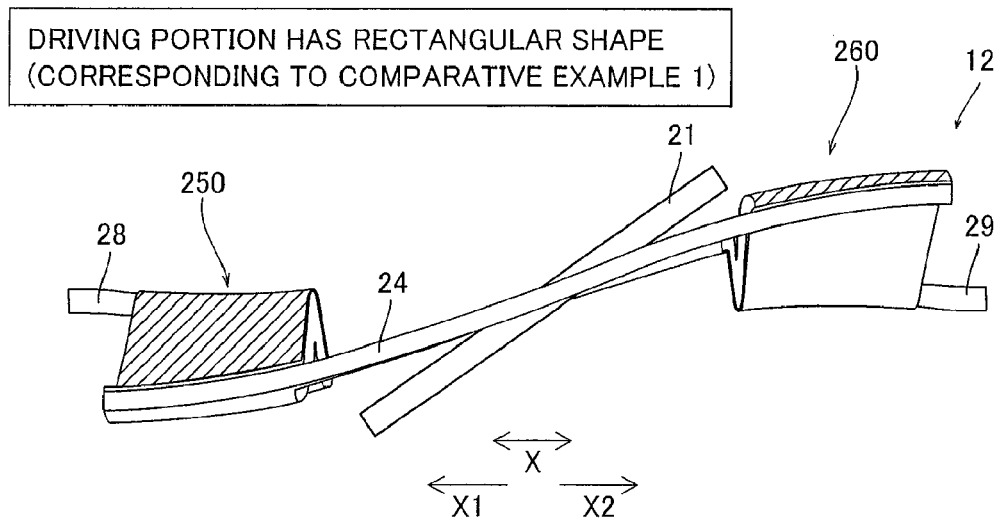
FIG. 15 is a diagram for illustrating a driven state of the vibrating mirror element according to comparative example 1 of the present invention.
Figure 16:
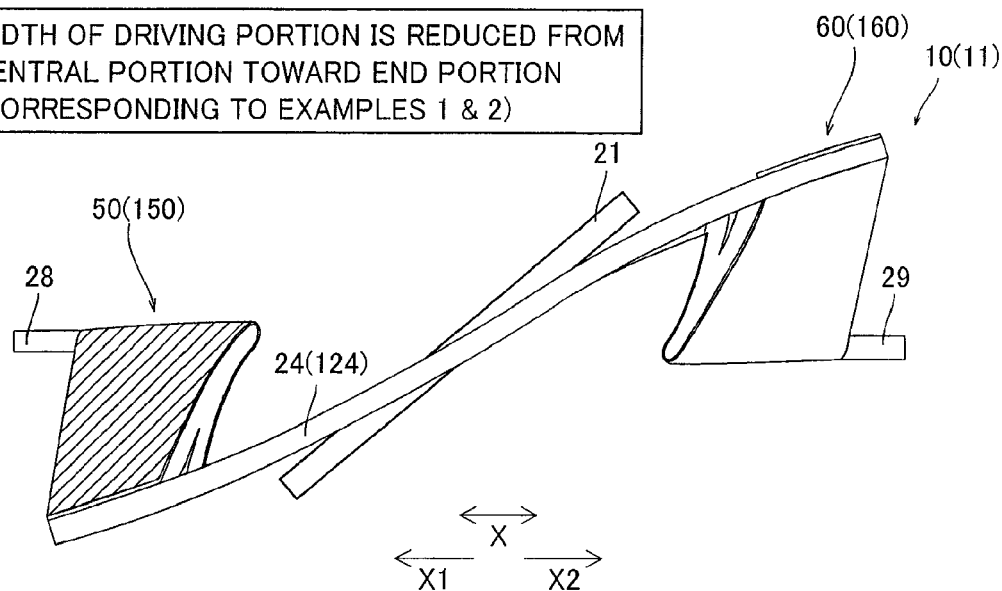
FIG. 16 is a diagram for illustrating a driven state of the vibrating mirror element according to each of Examples 1 and 2 of the present invention.

In a vibrating mirror element 12 according to comparative example 1 shown in FIG. 14, the width W3 of a central portion 50e of a driving portion 250 in a direction X and the width W3 of end portions 250f and 250g in the direction X were rendered identical (500 μm) to each other while the width W3 of a central portion 60e of a driving portion 260 in the direction X and the width W3 of end portions 260f and 260g in the direction X were also rendered identical (500 μm) to each other, so that the driving portions 250 and 260 had rectangular shapes extending in a direction Y in plan view. The structures of Example 2 and comparative example 1 were rendered identical to that of Example 1, except the varied parameters.

Figure 13:
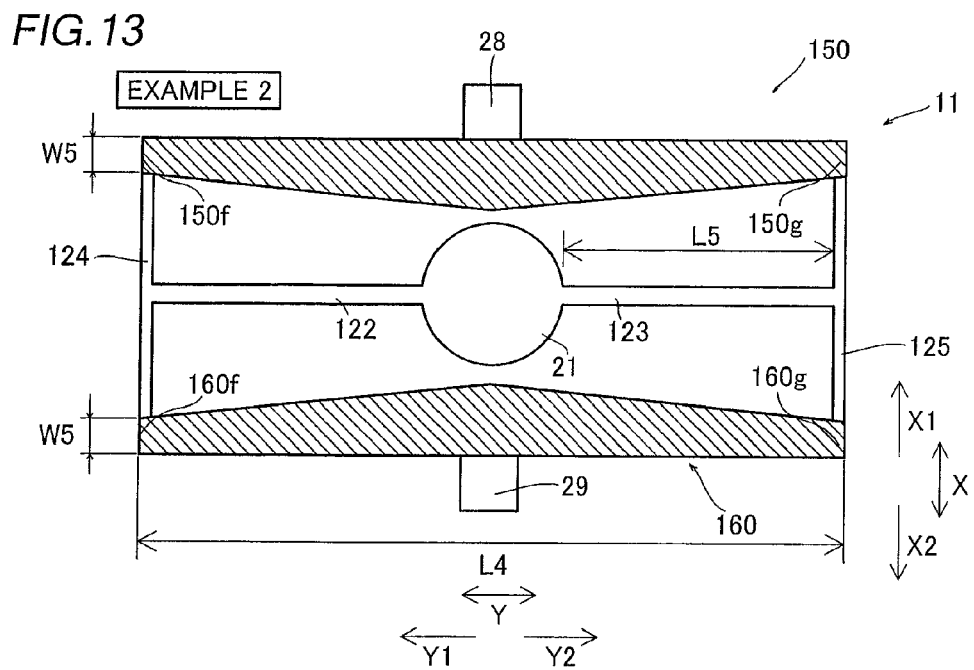
FIG. 13 is a plan view showing the overall structure of a vibrating mirror element according to Example 2 of the present invention.

Results of simulations as to angles of inclination of mirror portions and resonance frequencies conducted by setting voltages applied to upper electrodes and lower electrodes to 8 V in Examples 1 and 2 and comparative example 1 shown in FIGS. 2, 13 and 14 respectively are now described. The angle of inclination of each mirror portion was set to have a minus value when the mirror portion was inclined in a direction A and to have a plus value when the mirror portion was inclined in a direction B.

In the simulation of Example 1 shown in FIG. 2, the angle of inclination of the mirror portion was −10.9° to +10.9°, and the resonance frequency was 21950 Hz. In the simulation of Example 2 shown in FIG. 13, the angle of inclination of the mirror portion was −11.4° to +11.4°, and the resonance frequency was 16900 Hz. In the simulation of comparative example 1 shown in FIG. 14, the angle of inclination of the mirror portion was −6.6° to +6.6°, and the resonance frequency was 21180 Hz.

Comparing Examples 1 and 2 with each other from the aforementioned results of the simulations, it has been recognized that the angle of inclination of the mirror portion is slightly enlarged when the areas of the driving portions are increased as in Example 2. This is conceivably because the driving force of the driving portions depends on the areas of the driving portions. It has also been recognized that the resonance frequency is reduced when the widths of the end portions of the driving portions are increased as in Example 2. This is conceivably because the end portions are hard to torsionally deform due to the increased widths of the end portions. It has further been recognized that the resonance frequency is reduced when the lengths of the driving portions in the longitudinal direction are increased as in Example 2. This is conceivably because the amplitudes in the driving portions are so increased that the frequency of vibration on the driving portions is reduced.

Comparing Example 1 and comparative example 1 with each other, it has been recognized that the angle of inclination of the mirror portion is enlarged when the widths of the driving portions are continuously reduced from the central portions toward both end portions as in Example 1. This is conceivably because the end portions of the driving portions are hardly twisted and hence inclination of the bars connected with the end portions of the driving portions substantially depends on deflection of the driving portions in the longitudinal direction when the driving portions are in the form of rectangles having constant widths as in comparative example 1 shown in FIG. 15 while the end portions of the driving portions are twisted in directions for further inclining the bars and hence inclination of the bars connected with the end portions of the driving portions depends on deflection of the driving portions in the longitudinal direction and torsional deformation of the end portions when the driving portions are so formed that the widths thereof are reduced from the central portions toward the end portions as in Example 1 shown in FIG. 16.

In the vibrating mirror element according to the present invention, both of the angle of inclination of the mirror portion and the resonance frequency are preferably enlarged, in consideration of enlargement of a scanning range and improvement of a scanning rate at the time of one-dimensionally scanning the reflected light of the laser beam or the like applied to the mirror portion. In other words, Example 1 corresponding to the vibrating mirror element 10 according to the embodiment of the present invention, capable of enlarging both of the angle of inclination of the mirror portion and the resonance frequency, is conceivably optimum.

Although the present invention has been described and illustrated in detail, it is clearly understood that the same is by way of illustration and example only and is not to be taken by way of limitation, the spirit and scope of the present invention being limited only by the terms of the appended claims.

Figure 17:
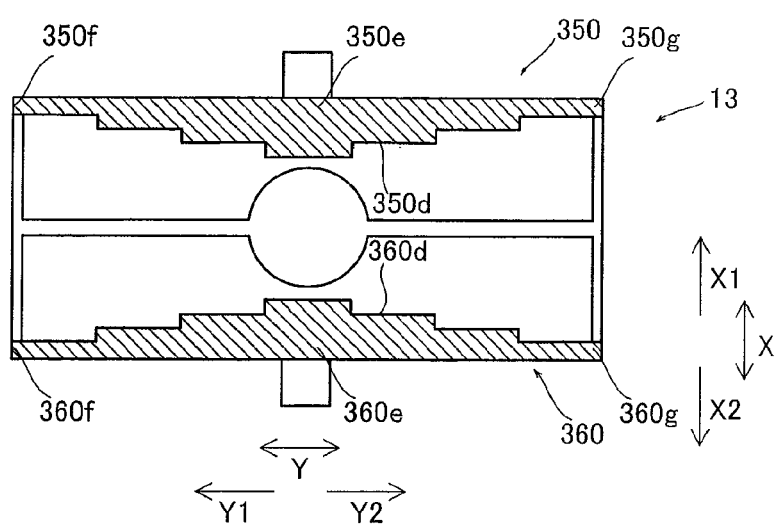
FIG. 17 is a plan view showing the overall structure of a vibrating mirror element according to a first modification of the embodiment of the present invention.

For example, while the driving portions 50 and 60 are so formed that the widths thereof are continuously reduced from the central portions 50e and 60e toward the end portions 50f (50g) and 60f (60g) respectively in the aforementioned embodiment, the present invention is not restricted to this. According to the present invention, side surface portions 350d and 360d of driving portions 350 and 360 may be deformed stepwise as in a vibrating mirror element 13 according to a first modification shown in FIG. 17, so that the widths of the driving portions 350 and 360 are reduced stepwise from central portions 350e and 360e toward end portions 350f (350g) and 360f (360g). According to this structure, connecting portions can be torsionally deformed to be deflected oppositely to the end portions 350f (350g) and 360f (360g) on steps, whereby beam portions (torsion bars and bars) can be more easily deformed. Thus, the angle of inclination of the mirror portion can be further enlarged. The number of the steps is not particularly restricted.

Figure 18:
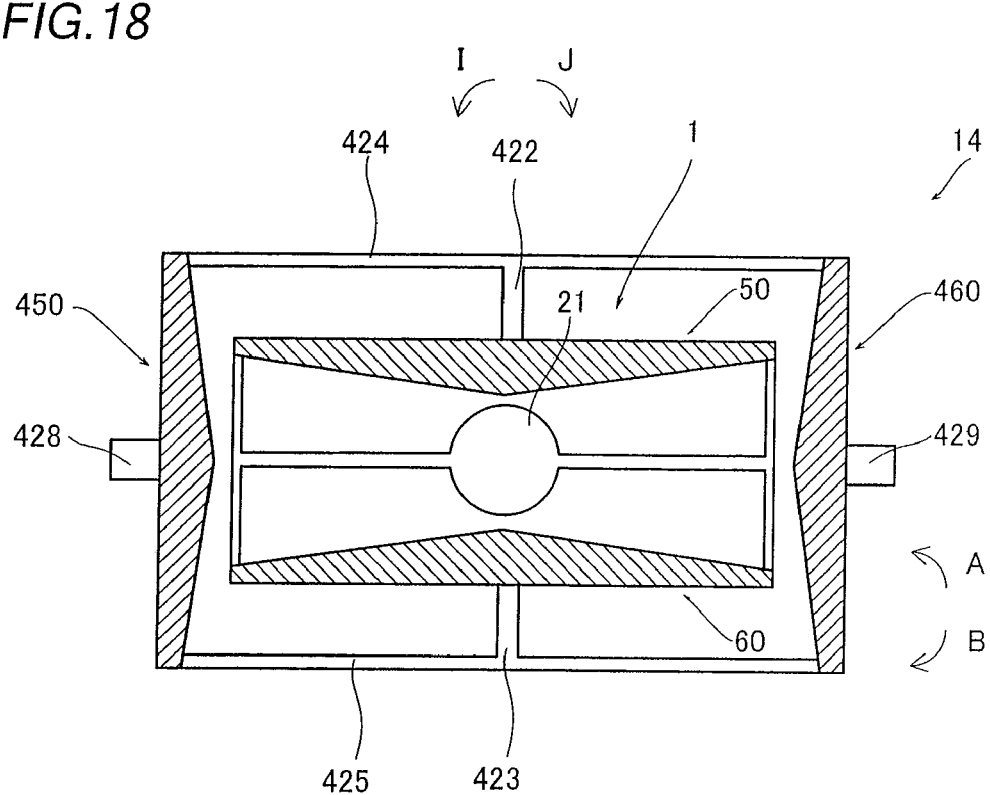
FIG. 18 is a plan view showing the overall structure of a vibrating mirror element according to a second modification of the embodiment of the present invention.

While the mirror portion 21 of the vibrating mirror element 10 is inclined only in the directions A and B (in a one-dimensional manner) in the aforementioned embodiment, the present invention is not restricted to this. According to the present invention, the mirror portion of the vibrating mirror element may alternatively be two-dimensionally inclined. As in a second modification shown in FIG. 18, for example, a vibrating mirror element 14 may be formed by replacing the pair of fixed portions 28 and 29 of the vibrating mirror element 10 according to the aforementioned embodiment with a pair of torsion bars 422 and 423, so that end portions of the pair of torsion bars 422 and 423 are perpendicularly connected with central portions of a pair of bars 424 and 425 respectively. Both end portions of the pair of bars 424 and 425 are perpendicularly connected with a pair of driving portions 450 and 460 having shapes similar to those of the driving portions 50 and 60 respectively, and fixed to bases (not shown) by a pair of fixed portions 428 and 429. Thus, the mirror portion 21 can be two-dimensionally inclined and vibrated in directions A and B and directions I and J.

While the side surface portion 26c (27c) of the movable portion 26 (27) on the side of the direction X1 (X2) is formed to linearly extend in the direction Y in the aforementioned embodiment, the present invention is not restricted to this. According to the present invention, the side surface of the movable portion opposite to the bar may alternatively be inclined.

While the side surface portion 26d (27d) of the movable portion 26 (27) on the side of the direction X2 (X1) is formed to be continuously and linearly inclined in the direction X1 (X2) from the central portion 26e (27e) toward the end portions 26a (27a) and 26b (27b) of the movable portion 26 (27) in the aforementioned embodiment, the present invention is not restricted to this. According to the present invention, the side surface of the movable portion on the side of the bar may not be continuously inclined from the central portion toward the end portions.

While the piezoelectric bodies 50a and 60a are made of lead zirconate titanate (PZT) in the aforementioned embodiment, the present invention is not restricted to this. According to the present invention, the piezoelectric bodies may alternatively be made of a piezoelectric material, other than PZT, consisting of an oxide mainly composed of lead, titanium and/or zirconium or another piezoelectric material. For example, the piezoelectric bodies may be made of a piezoelectric material such as zinc oxide (ZnO), lead lanthanum zirconate titanate ($(Pb,La)(Zr,Ti)O_3$), potassium niobate ($KNbO_3$) or sodium niobate ($NaNbO_3$).

While the driving portions 50 and 60 and the bars 24 and 25 are connected with each other on the end portions 50f, 50g, 60f and 60g of the driving portions 50 and 60 in the aforementioned embodiment, the present invention is not restricted to this. According to the present invention, the driving portions and the bars may alternatively be connected with each other on positions other than the end portions of the driving portions.

While the "beam portion" in the present invention consists of the torsion bars 22 and 23 and the bars 24 and 25 in the aforementioned embodiment, the present invention is not restricted to this. According to the present invention, the "beam portion" may alternatively consist of either torsion bars or bars.

While the driving portions 50 and 60 are driven by the piezoelectric elements 30 and 40 respectively in the aforementioned embodiment, the present invention is not restricted to this. According to the present invention, the driving portions may alternatively be driven by driving sources other than the piezoelectric elements.

While the mirror portion 21 has a circular shape in plan view in the aforementioned embodiment, the present invention is not restricted to this. According to the present invention, the mirror portion may alternatively have a square shape or a rectangular shape in plan view.

While the mirror portion 21, the torsion bars 22 and 23, the bars 24 and 25, the movable portions 26 and 27 and the fixed portions 28 and 29 are integrally formed in the aforementioned embodiment, the present invention is not restricted to this. According to the present invention, the mirror portion, the torsion bars, the bars, the movable portions and the fixed portions may not be integrally formed, but a mirror portion, torsion bars, bars, movable portions and fixed portions consisting of separate members may alternatively be bonded to each other by adhesion or the like.

While the width W1 of the torsion bars 22 and 23 and the width W2 of the bars 24 and 25 are rendered smaller than the width W3 of the central portions 26e and 27e of the driving portions 50 and 60 in the aforementioned embodiment, the present invention is not restricted to this. According to the present invention, the width W1 of the torsion bars 22 and 23 and the width W2 of the bars 24 and 25 may alternatively be in excess of the width W3 of the central portions 26e and 27e of the driving portions 50 and 60.

While the piezoelectric elements 30 and 40 are formed substantially on the overall upper surfaces of the movable portions 26 and 27 in the aforementioned embodiment, the present invention is not restricted to this. According to the present invention, the piezoelectric elements may alternatively be only partially formed on the upper surfaces of the movable portions.

While the torsion bars 22 and 23 are formed to extend on the straight line passing through the center of the mirror portion 21 and extending in the direction Y in the aforementioned embodiment, the present invention is not restricted to this. According to the present invention, the torsion bars may not be formed to extend on the straight line passing through the center of the mirror portion and extending in the direction Y.

What is claimed is:

1. A vibrating mirror element comprising:
   a mirror portion reflecting light;
   a torsionally deformable beam portion not having a driving electrode and connected to said mirror portion for supporting said mirror portion in a vibratile manner; and
   a driving portion having a driving electrode for deforming said driving portion and a connecting portion which is provided with said driving electrode and connected with said torsionally deformable beam portion for driving said mirror portion through said torsionally deformable beam portion, wherein
   the width of said connecting portion of said driving portion having said driving electrode is rendered smaller than the width of a portion of said driving portion having said driving electrode other than said connecting portion in plan view, and
   said beam portion is torsionally deformed by deformation of said driving portion.

2. The vibrating mirror element according to claim 1, wherein
   said connecting portion of said driving portion is formed on an end portion of said driving portion.

3. The vibrating mirror element according to claim 1, wherein
   said beam portion is connected with said driving portion from a direction orthogonal to the longitudinal direction of said driving portion on said connecting portion, and
   a side surface of said driving portion opposite to said connecting portion is formed to extend in a direction parallel to the longitudinal direction of said driving portion.

4. The vibrating mirror element according to claim 3, wherein
   a side surface of said driving portion closer to said connecting portion is formed to protrude toward the side of said beam portion in plan view.

5. The vibrating mirror element according to claim 1, wherein
   said beam portion includes a pair of first beam portions having first end portions connected with both sides of said mirror portion respectively and a pair of second beam portions connected with second end portions of said pair of first beam portions respectively, said driving portion includes a first driving portion having a pair of first connecting portions connected with first end portions of said pair of second beam portions respectively and a second driving portion having a pair of second connecting portions connected with second end portions of said pair of second beam portions respectively, and the widths of said pair of first connecting portions of said first driving portion are rendered smaller than the width of a portion of said first driving portion other than said pair of first connecting portions respectively, while the widths of said pair of second connecting portions of said second driving portion are rendered smaller than the width of a portion of said second driving portion other than said pair of second connecting portions respectively.

6. The vibrating mirror element according to claim 5, wherein said pair of first connecting portions of said first driving portion are formed on both end portions of said first driving portion respectively, while said pair of second connecting portions of said second driving portion are formed on both end portions of said second driving portion respectively.

7. The vibrating mirror element according to claim 5, wherein said pair of first beam portions are formed to extend on a straight line passing through the center of said mirror portion toward one side of said mirror portion and toward another side of said mirror portion respectively, and a side surface of said first driving portion opposite to said connecting portion and a side surface of said second driving portion opposite to said connecting portion are formed to extend in a direction parallel to said straight line passing through the center of said mirror portion respectively.

8. The vibrating mirror element according to claim 1, further comprising a fixed portion provided in the vicinity of a central portion of said driving portion in the longitudinal direction for constituting a fixed end in vibration of said driving portion, wherein said driving portion is so formed that the width thereof is gradually reduced from a portion in the vicinity of said fixed portion toward said connecting portion of said driving portion in plan view.

9. The vibrating mirror element according to claim 8, wherein said driving portion is so formed that the width thereof is continuously reduced from said portion in the vicinity of said fixed portion toward said connecting portion of said driving portion in plan view.

10. The vibrating mirror element according to claim 9, wherein a side surface of said driving portion closer to said connecting portion is formed to linearly extend in a state inclined with respect to the longitudinal direction of said driving portion in plan view.

11. The vibrating mirror element according to claim 8, wherein said driving portion is so formed that the width thereof is reduced stepwise from said portion in the vicinity of said fixed portion toward said connecting portion of said driving portion in plan view.

12. The vibrating mirror element according to claim 11, wherein a side surface of said driving portion closer to said connecting portion is formed to have a step in plan view.

13. The vibrating mirror element according to claim 8, wherein the width of said beam portion is rendered smaller than the width of at least said portion of said driving portion in the vicinity of said fixed portion.

14. The vibrating mirror element according to claim 1, wherein said driving portion is formed to be substantially symmetrical to a straight line passing through a substantially central portion of said driving portion in the longitudinal direction and extending in the short-side direction of said driving portion in plan view.

15. The vibrating mirror element according to claim 1, wherein said connecting portion of said driving portion is formed as a free end, and said beam portion connected to said connecting portion of said driving portion is inclined and torsionally deformed by flexural deformation and torsional deformation of said driving portion.

16. The vibrating mirror element according to claim 1, wherein said mirror portion and said beam portion are integrally formed.

17. The vibrating mirror element according to claim 16, wherein said driving portion includes a movable portion integrally formed with said mirror portion and said beam portion and a driving element formed on the surface of said movable portion.

18. The vibrating mirror element according to claim 1, wherein said driving portion includes a movable portion connected with said beam portion and a driving element formed substantially over the entire surface of said movable portion.

19. The vibrating mirror element according to claim 1, wherein said driving portion includes a first driving portion connected with a first end portion of said beam portion and driven by application of a voltage and a second driving portion connected with a second end portion of said beam portion and driven by application of a voltage, said mirror portion and said beam portion are formed to resonate at a prescribed resonance frequency, and said first driving portion and said second driving portion are formed to be deformed in opposite directions by application of voltages having frequencies substantially identical to said prescribed resonance frequency and having phases reverse to each other respectively.

20. The vibrating mirror element according to claim 1, further comprising:

an outer beam portion connected to said driving portion and torsionally deformable, and an outer driving portion having an outer connecting portion connected with said outer beam portion for driving said mirror portion.

21. A vibrating mirror element comprising:

a mirror portion reflecting light;

a torsionally deformable beam portion not having a driving electrode and connected to said mirror portion for supporting said mirror portion in a vibratile manner; and a driving portion having a driving electrode for deforming said driving portion and a connecting portion which is provided with said driving electrode and connected with said torsionally deformable beam portion for driving said mirror portion through said torsionally deformable beam portion, wherein the width of said connecting portion of said driving portion having said driving electrode is rendered smaller than the width of a portion of said driving portion having said driving electrode other than said connecting portion in plan view, said connecting portion of said driving portion is formed on an end portion of said driving portion.

* * * * *